United States Patent
Lin (10) Patent No.: US 8,572,736 B2
(45) Date of Patent: Oct. 29, 2013

(54) SYSTEM AND METHOD FOR DETECTING BEHAVIOR ANOMALY IN INFORMATION ACCESS

(76) Inventor: Yeejang James Lin, San Jose, CA (US)

( * ) Notice: Subject to any disclaimer, the term of this patent is extended or adjusted under 35 U.S.C. 154(b) by 817 days.

(21) Appl. No.: 12/431,946

(22) Filed: Apr. 29, 2009

(65) Prior Publication Data

US 2010/0122120 A1    May 13, 2010

Related U.S. Application Data (60) Provisional application No. 61/113,706, filed on Nov. 12, 2008.

(51) Int. Cl.
*G06F 11/00*    (2006.01)

(52) U.S. Cl.
USPC .................. 726/23; 726/22; 726/24; 726/25; 713/188

(58) Field of Classification Search
USPC ............ 726/22, 23, 24, 25; 713/188; 709/224
See application file for complete search history.

(56) References Cited

U.S. PATENT DOCUMENTS

| | | | |
|---|---|---|---|
| 6,671,811 B1 * | 12/2003 | Diep et al. | 726/23 |
| 7,490,072 B1 | 2/2009 | Cowan | |
| 7,831,621 B1 * | 11/2010 | Banks et al. | 707/790 |
| 2003/0204626 A1 * | 10/2003 | Wheeler | 709/245 |
| 2005/0086529 A1 | 4/2005 | Buchsbaum | |
| 2007/0067853 A1 * | 3/2007 | Ramsey | 726/28 |
| 2007/0073519 A1 | 3/2007 | Long | |

* cited by examiner

*Primary Examiner* — Edward Zee
*Assistant Examiner* — Baotran N To
(74) *Attorney, Agent, or Firm* — Wang Law Firm, Inc.; Li K. Wang; Stephen Hsu (57) ABSTRACT

The present invention provides a system and method for identifying anomaly in information requests. The information requests are modeled into a plurality of basic elements and association among the basic elements are tracked. The association of one information request is compared with a plurality of bitmap tables and counters representing a baseline information from a historical behavior information. If the association of this information request differs from the baseline information, an alert is issued.

19 Claims, 9 Drawing Sheets

SYSTEM AND METHOD FOR DETECTING BEHAVIOR ANOMALY IN INFORMATION ACCESS

RELATED APPLICATION

This application claims benefits of the U.S. Provisional Application for Method For Accurately Detect Anomalous Information Access, U.S. Provisional Pat. App. No. 61/113,706, filed on Nov. 12, 2008, the specification of which is included in its entirety by this reference.

BACKGROUND OF THE INVENTION

1. Field of the Invention

The present invention generally relates to data security, and more specifically, relates to a system and method that monitor information access requests in a network.

2. Description of the Related Art

Information equals to power and having access to the right information equals having a competitive advantage over others in today's world. Each company closely guards the information essential to their business. Traditionally, the access to sensitive information of each company is restricted to a small number of authorized personnel. This access control scheme is simple and easy to implement; however, it is not flexible and does not detect abnormal access by those who are authorized.

An authorized user may be authorized to access personnel data and he accesses regularly once a week during the working hours. However, he may start to access the personnel data file more frequently and remotely from his home. This abnormal behavior would not be detected under the traditional access control scheme since the authorized user is accessing.

Therefore, there is a need for a system that detects abnormal user behavior and it is to this system the present invention is primarily directed to.

SUMMARY OF THE INVENTION

In one embodiment, the present invention provides a system for detecting anomalous behavior in information access. The system comprises a network interface unit for receiving data packets containing an information access request, a memory for storing a database containing historical behavior information, and a controller for analyzing the information access requests and modeling the information access request into plurality of basic elements. The historical behavior information is implemented through a plurality of bitmap tables and counters, and the content of each counter is derived from the bitmap tables and has also a threshold. The controller compares the information access request with the plurality of bitmap tables and counters and issues an alert if the information access requests exceed a threshold in the historical behavior information.

In another embodiment, there is also provided a method for detecting anomalous behavior in information access. The method comprises the steps of receiving by a network interface unit data packets containing an information access request, parsing by a controller contents of the information access request into a plurality of basic elements, comparing by the controller each basic element of the information access request with a bitmap table representing a historical behavior information stored in a database, modifying a counter according to a comparison result, and issuing an alert if the counter exceeds a threshold set for the counter.

In yet another embodiment, there is provided another method for detecting anomalous information access. The method comprises the steps of receiving an information access request at a network interface, disassembling the information access request into a plurality of basic elements, comparing each basic element with at least one bitmap table and at least one counter stored in a memory, and issuing an alert if an anomaly is detected.

The present system and methods are therefore advantageous as they enable identification of abnormal information access behaviors. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which.

DETAIL DESCRIPTION OF THE INVENTION

In this description, the term "application" as used herein is intended to encompass executable and non-executable software files, raw data, aggregated data, patches, and other code segments. The term "exemplary" is meant only as an example, and does not indicate any preference for the embodiment or elements described. Further, like numerals refer to like elements throughout the several views, and the articles "sa" and "the" includes plural references, unless otherwise specified in the description. The terms "baseline," "baseline information," "baseline database," and "historical behavior information" are used interchangeably. The terms "bitmap" and "bitmap table" are used interchangeably.

In an overview, the present invention provides a system and method for detecting abnormal behavior in information access. The system of the present invention breaks down the information access into multiple elements and establishes a relationship between these elements. The information access can be described by interaction between these elements. When an interaction differs from a standard set according to previous behavior, the system will detect this abnormal interaction and issues an alert. The system is intelligent and self adjust according to external instructions or inaction. An abnormal behavior that is detected, reported, and not taken any action can become a new "normal" behavior. For example, if a user starts to access a sensitive data remotely from his home after working hour, the system will detect and issue an alert each time the user accesses the information this way. However, the system may lower the alert level after one week and may stop issuing the alert after one month. This access pattern will become the new normal pattern for this user. If the user starts to access a different sensitive data that he never accessed before, the system will again detect and issue a different alert, and the cycle will repeat.

Figure 1:
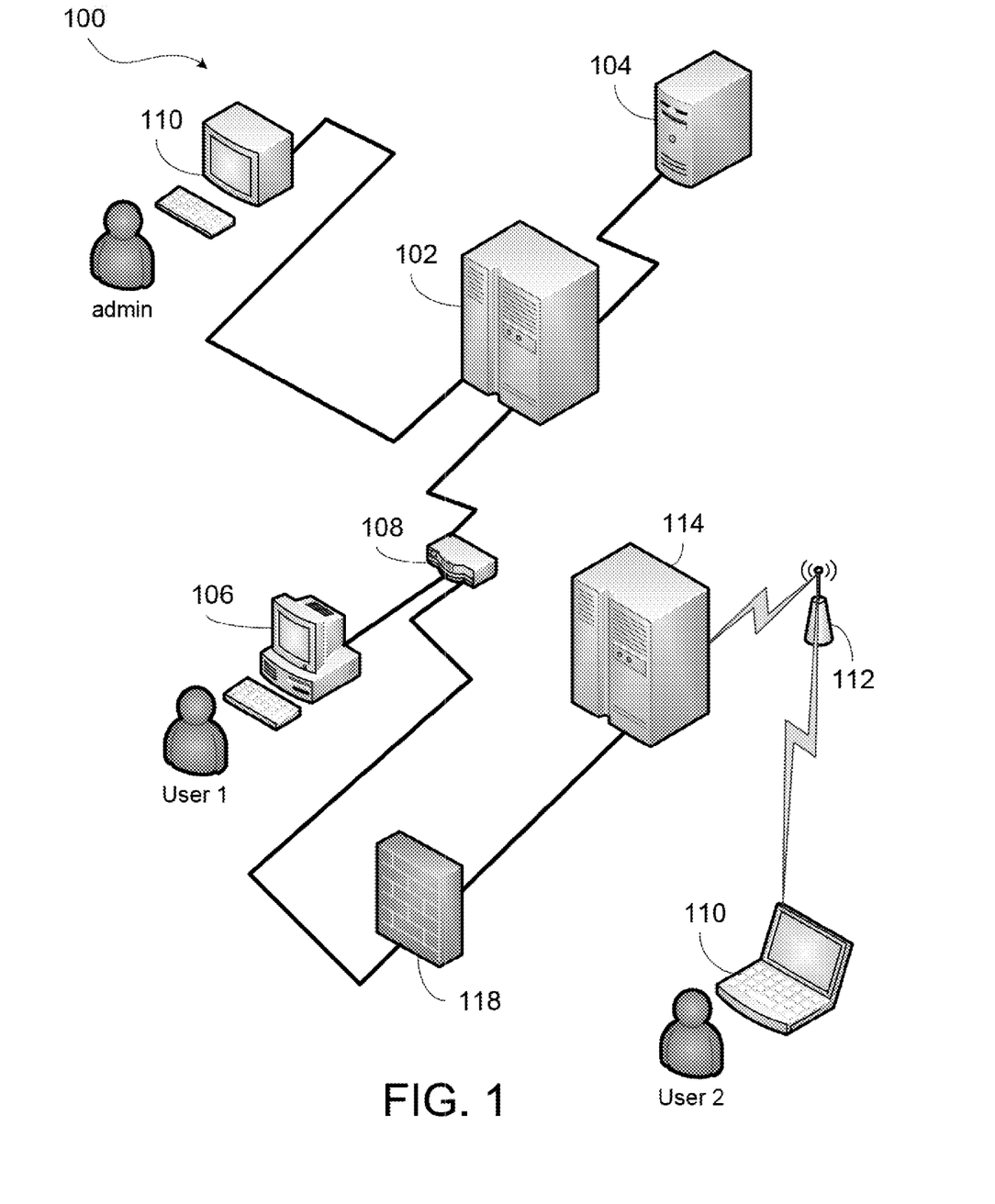
FIG. 1 depicts a system in which the present invention supports.

FIG. 1 illustrates a system 100 that the present invention can easily support. The sensitive data for a company or business may reside on company's main computer 102 or a server 104 and the access to this sensitive data is monitored. The monitoring can be done by a system administrator sitting in front of a terminal 110; alternatively, the monitoring and the reporting of abnormal access can also be reported to a specifically designated terminal control by the owner of the sensitive data or by the owner of the business. This special monitoring and reporting can track any abnormal behavior by the system administrator himself.

The sensitive data can also be accessed by a user through a computer 106 connected to a router 108. Another user who may be at home or at client's site may access the sensitive data through a laptop computer 110 in communication wirelessly to a radio tower 112 of a mobile telephone network. The information access request received from the laptop computer 110 is sent to the mobile switching center 114, which transmits the information access request through a public data network and a fire wall 118 into the private network serviced by the company. Those skilled in the art will appreciate that other data network configurations may also be supported by the present invention.

Figure 2A:
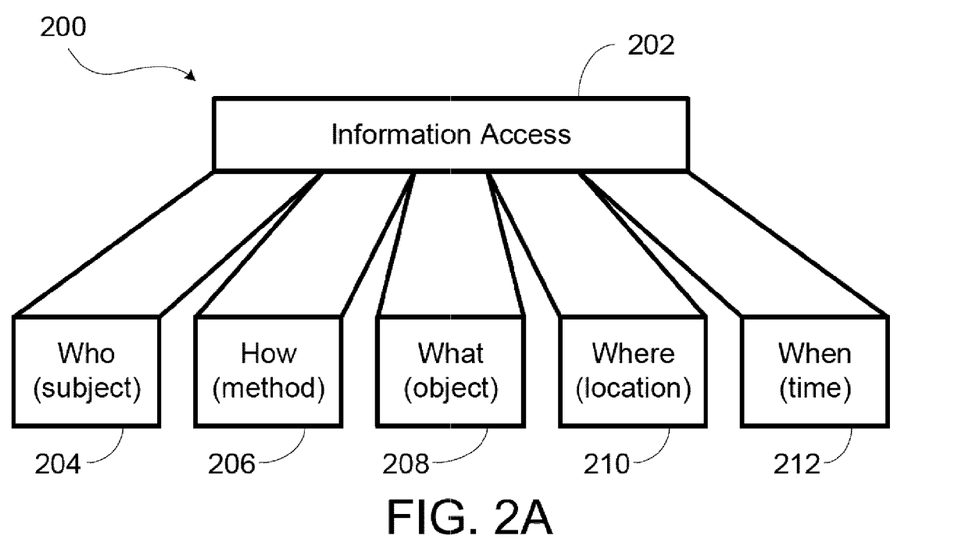
FIG. 2A depicts a model of information access according to the present invention.

FIG. 2A depicts a model 200 of information access. A request 202 to access information involves many elements but can be broken down into the following basic elements or element groups: who is requesting the information 204, how the information is requested 206, what information is requested 208, from where the information is requested 210, and when the information is requested 212. For example, when an account holder checks his bank account balance using his home computer after dinner, the "who" is an end user, the "how" is retrieval, the "what" is account information, the "where" is remote location, and the "when" is evening. The basic factors may also be described at more detail level, for example, the "where" may be a port number through which the request from the home computer is received, and the "who" may be the application that originates the request.

Figure 2B:
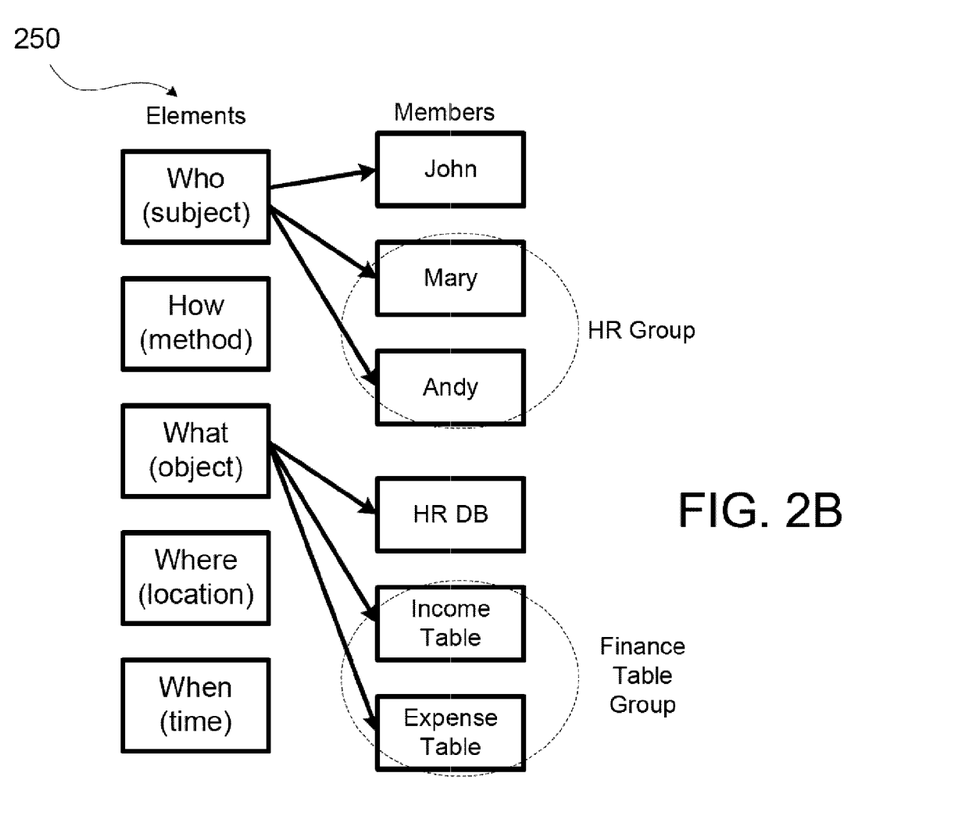
FIG. 2B depicts a relationship between elements, members, and groups.

FIG. 28 depicts a relationship 250 among elements of the model 200 of information access. As explained above, the information access can be broken down into elements, and there are members for each element and these members can be grouped together. For example, Mary is a member of "who" element, so are Andy and John. However, Mary and Andy belong to "HR group" and John does not. By belonging to the HR group, Mary and Andy have special permission to access some sensitive information, such as income table file and expense table file. These two files belong to financial table group. This group can be set, so that people outside of HR group, such as John, will not have access.

Figure 3:
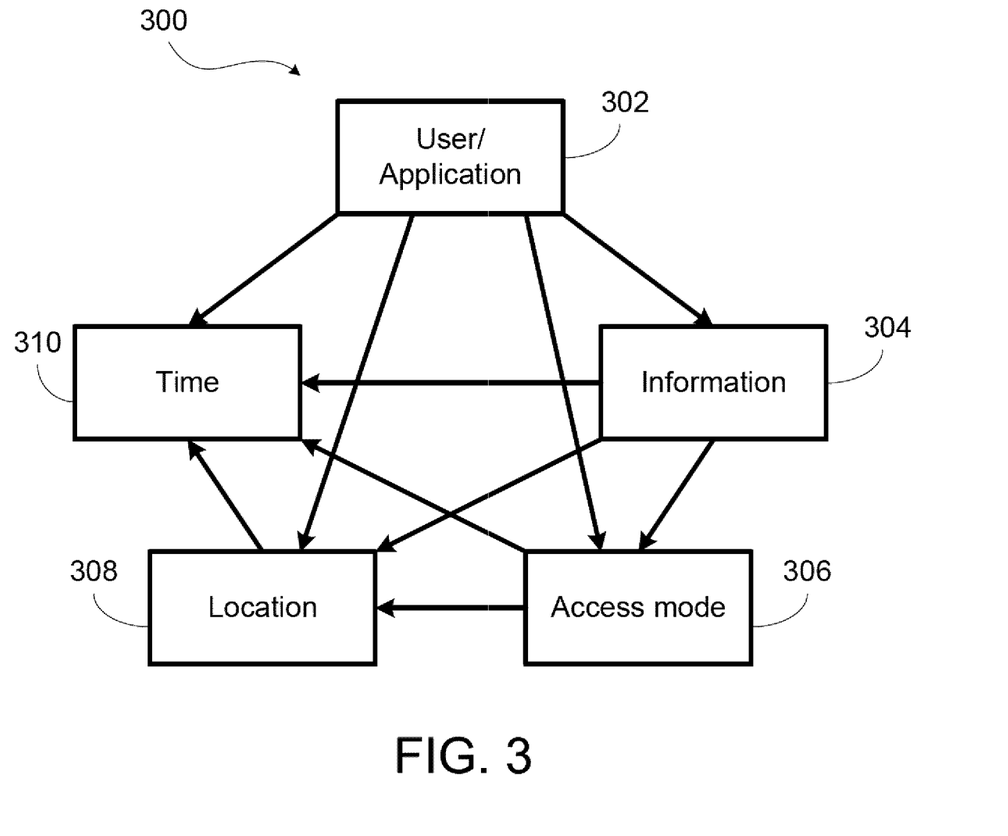
FIG. 3 illustrates an association between elements of information access.

Each element in the information model is associated with other elements of the information model and FIG. 3 illustrates the association 300 among the elements. During an information access, the user 302 is associated with the information 304 he is seeking. The user's access to the information involves an access mode 306. The information access is also associated with location 308 and time of access 310. Each information access is identified by the association among these elements. FIG. 3 also illustrates one-to-one association between different elements. User 302 is associated with the information 304; user 302 is also directly associated with access mode 306, location 308, and time 310. Information 304 is directly associated with access mode 306, location 308, and time 310. Access mode 306 is directly associated with location 308 and time 310. Finally, location 308 is directly associated to time 310. These direct associations are useful for practical implementation of the present invention.

Figure 4:
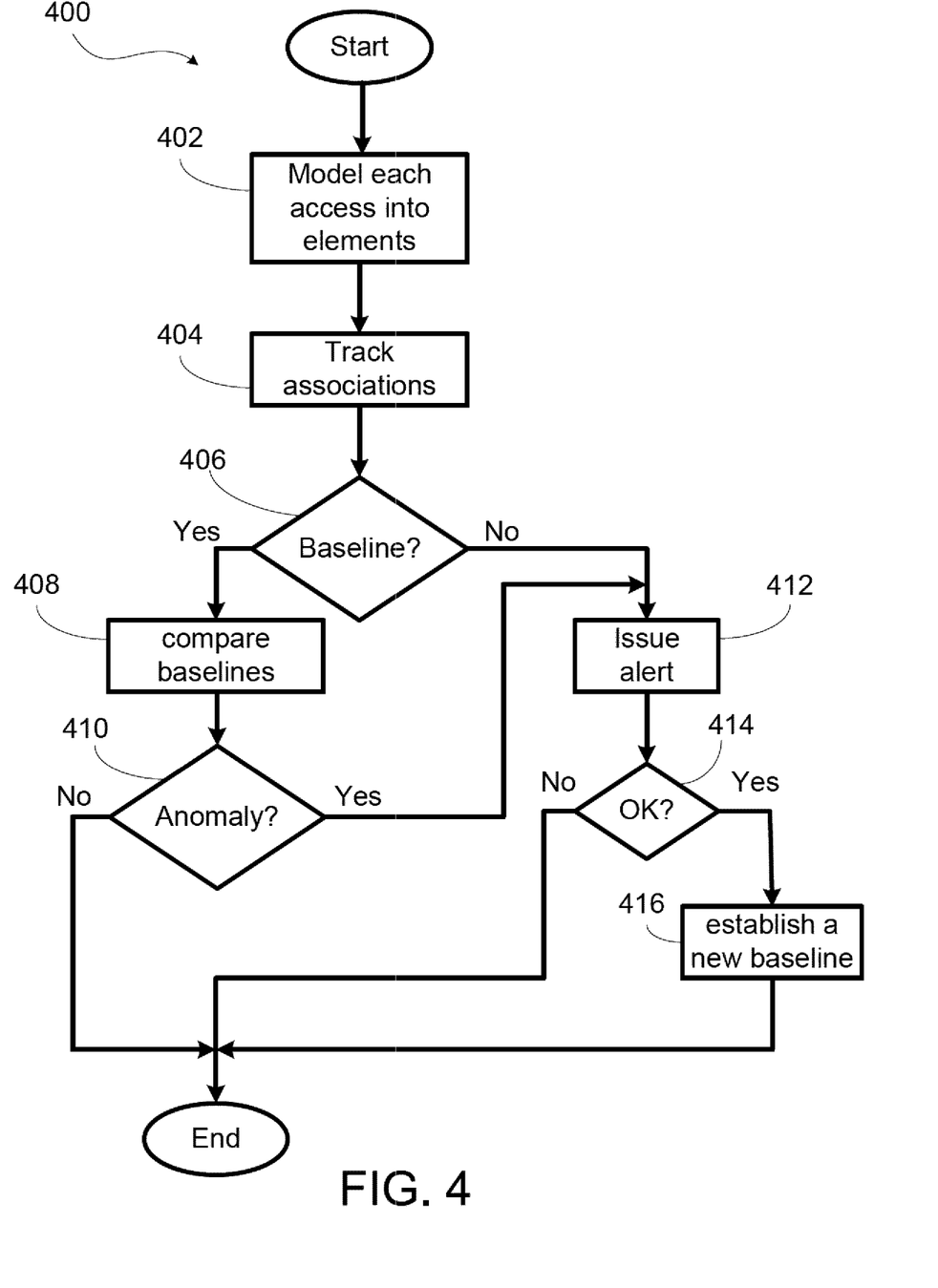
FIG. 4 depicts a method for detecting anomaly behavior in information access according to the present invention.

FIG. 4 depicts a method 400 for detecting anomalous behavior in information access according to the present invention. The information in every information request is retrieved, analyzed, and modeled into the basic elements, step 402. The information from the information request is disassembled into the basic elements. The association among the elements of the information access is tracked, step 404. After tracking the association among the elements of the information request, it is checked whether there is a baseline for this association, step 406. The baseline is historical behavior derived from the historical data and the baseline can be for a particular member (e.g. user, information, etc) or for a particular member group. A behavior is defined in terms of association among elements for each member or each member group and association is preferably implemented through bitmaps and counters as explained later on through FIGS. 8 and 9.

If there is a baseline, the association among the elements of the information access is compared with the baseline from the historical data, step 408, for detecting abnormal request, step 410. If an anomaly is detected, an alert is issued, step 412, and a system administrator is informed. If the system administrator judges the anomaly is acceptable, step 414, the abnormal request is recorded as part of the baseline, step 416. Not all anomalies are unacceptable. Sometime a behavior may raise alert for a particular user, but the behavior is acceptable for the group to which the user belongs. Some behavior may be an indicator of a bigger problem and this behavior should not be incorporated into the baseline. For example, if the information access request is part of attack to the system, then it should not be recorded as part of the baseline, thus affecting future detection of anomalies. If there is no baseline for the tracking of the association of the elements of the information request, an alert is issued, step 412. Again, if the system administrator judges the access being OK, step 414, the association is incorporated into the baseline, step 416. The association not only is used to compare with the baseline, but also used to adjust the baseline for future use. The judgment whether an association is OK can be done by either a human or an expert system with a set of predefined rules.

Figure 5:
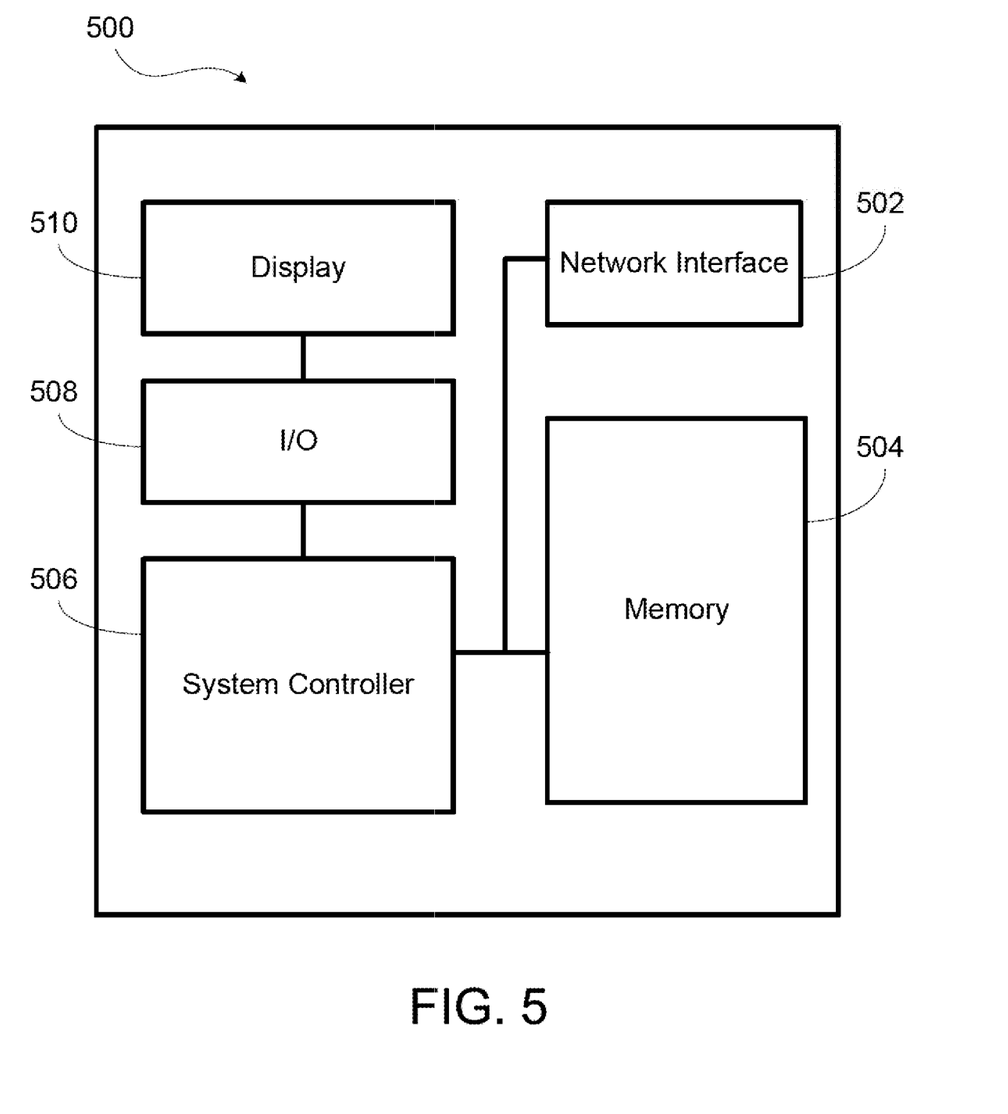
FIG. 5 illustrates a system supporting the present invention.

FIG. 5 illustrates a system 500 supporting the present invention according to one embodiment of the invention. The system 500 includes a memory or storing means 504 for storing databases used by the present invention, a network interface or interface means 502 for monitoring network activities, a display or display means 510 for displaying alerts, an I/O controller or I/O controlling means 508 for communicating with the users, and a system controller or system controlling means 506 for overseeing the operations according to the invention. People skilled in the art will appreciate that the elements of system 500 may be located in one or multiple hardware units. The system 500 may monitor multiple databases specified by the client and located in different physical locations. The access requests are sent back to the system 500 for analysis. The access requests are compared with the baseline database stored in the memory 504. If the system 500 detects an abnormal access request, then the system 500 issues an alert on the display 510. The user may further investigate the alert; if no action is taken by the user, the abnormal access request is recorded into the baseline database for future reference.

Figure 6:
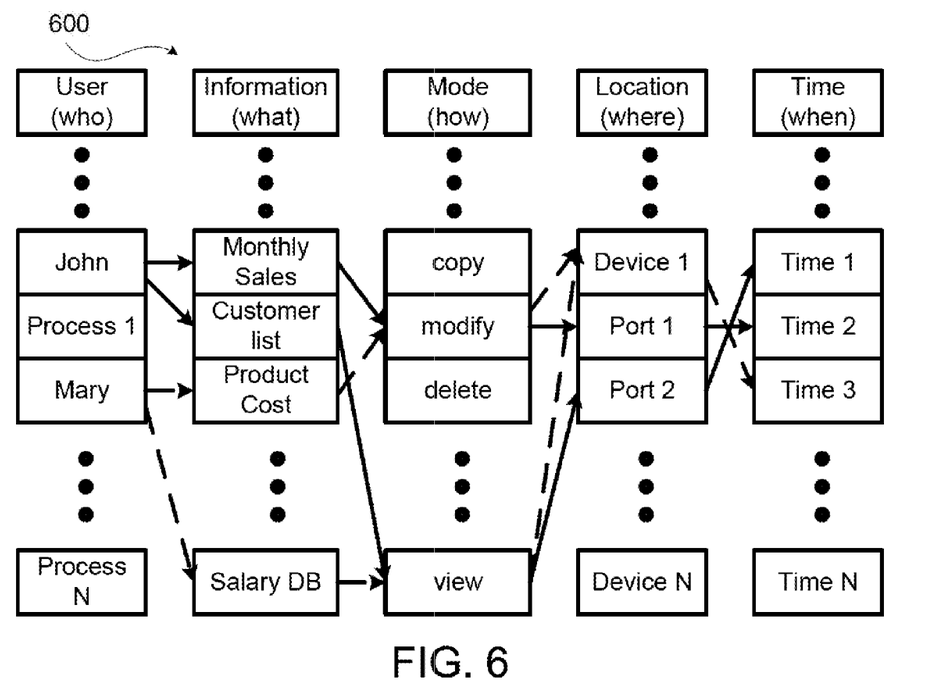
FIG. 6 illustrates a connection map for an exemplary embodiment.

FIG. 6 is an exemplary connection map 600 for illustration purpose. Each information access request is broken into five elements: user (who), information (what), mode (how), location (where), and time (when). As illustrated, user John has accessed a database with "monthly sales" information, and he modifies this data. John normally accesses the "monthly sales" database remotely through port 1 and during work hours (time 2). This regular access by user John is recorded in the baseline database 700 of FIG. 7 as entry 1 and it cases no alert. Another user Mary regularly accesses a database with "product cost" information regularly and she modifies this database using her work terminal (device 1) during the work hours (time 3). This regular access by user Mary is recorded as entry 2 in the same baseline database 700 of FIG. 7 and also causes no alert.

Now, if one day John accesses another database with "customer list" information and he scans the database for customer information and does not modify it. John reviews the "customer list" database from home through port 2 and during evening hours (time 1). This non-regular access by John is recorded as entry 3 and, assuming it is the first time for John to access this database, an alert N is issued. In another example, Mary accesses another database with "salary" information for review through her work terminal (device 1) during the work hours (time 3) and this access is recorded as entry 4. Assuming this is not the first time Mary accesses this salary database, the alert issued is 3. Each time that Mary accesses this salary database, the alert issued will be lower until this access becomes a "regular" access by Mary if this alert is approved by the system administrator. After an access becomes a "regular" access, then no alert will be issued. Those skilled in the art will appreciate that other criteria, such as time passage, may also be used to decrease the alert level. The "time" described above in FIGS. 6 and 7 need not to be an exact time; the "time" may be a time range, and a threshold may also be provided for this time range. Similarly, all the regular accesses by John may be considered to be within the threshold for user John.

Figure 7:
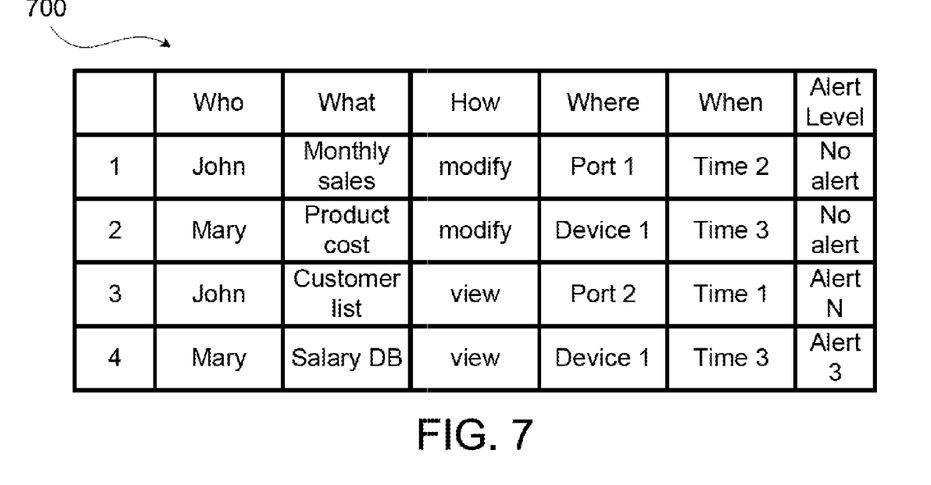
FIG. 7 illustrates a connection database for an exemplary embodiment.

The alert is issued not only for accessing a specific file not normally accessed, but also for accessing the file in a different way. For example, if John accesses the monthly sales database from his home and after working hours, the system will see this as an abnormal access because John changes his access behavior.

The above example and FIGS. 6 and 7 describe a general implementation of the idea behind the present invention. However, the general implementation may not be practical for a system in which there are a large number of elements under each basic element category. For example, to detect all variations for a user accessing information in a system that has 10,000 files and offers 100 access modes from 1,000 possible locations during 100 possible time slots, the order of variations would be $$O(n) = 10^4 \times 10^2 \times 10^3 \times 10^2 \times 10^{11}$$

just for one user, which makes implementation impractical. One way to make the implementation feasible is to use the direct connection relationship disclosed above in FIG. 3.

Figure 8:
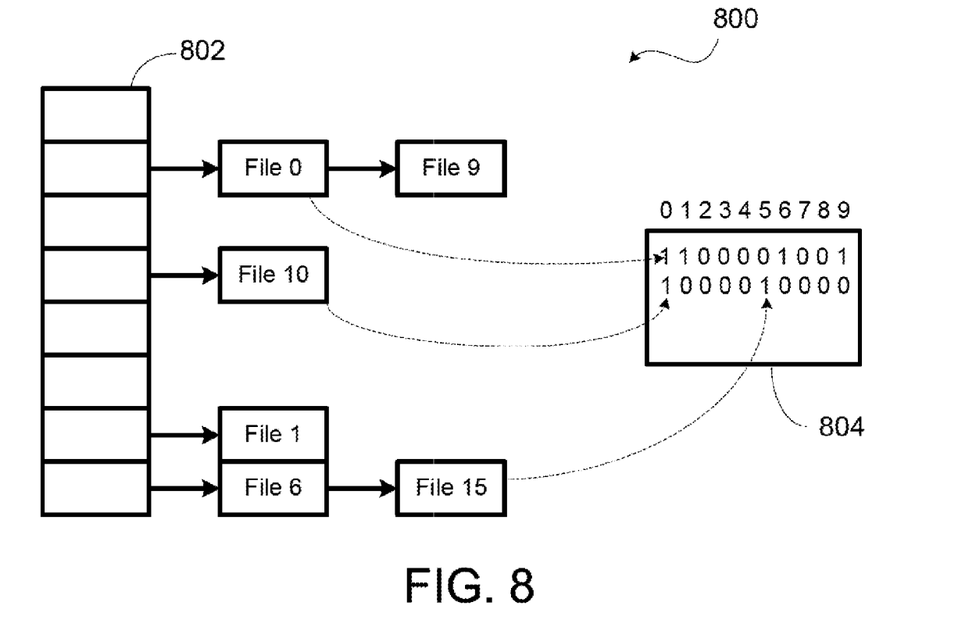
FIG. 8 illustrates a bitmap implementation of a relationship between two elements.

Instead of represented by a connection map of FIG. 6, the relationship between five elements can be represented by direct maps derived from the relationship model of FIG. 3. Taking the example described in FIGS. 6 and 7, instead using the connection map of FIG. 6 to describe John (who) accesses (how) the "monthly sales" database (what) remotely through port 1 (where) and during work hours (when), several direct maps are used to describe the relationships between the basic elements. The direct maps used are:

1. Who×What
2. Who×How
3. Who×Where
4. Who×When
5. What×How
6. What×Where
7. What×When
8. How×Where
9. How×When
10. Where×When Each direct map can be easily and manageably implemented with a bitmap or other suitable representation. FIG. 8 illustrates a novel way to implement the present invention. FIG. 8 is a bitmap implementation 800 of one direct map illustrating the relationship between a user (who) and a plurality of files (what). When user John accesses file X, the file X is hashed into a hash table 802. From the hash table 802, the file X is assigned to a file ID, for example file 10. A bitmap table 804 is used to represent all the available files. If file X (file 10) has been accessed before, the bit in location 10 is set. If the file X (file 10) has not been access before, the bit in location 10 is not set. So, from the bitmap table 804, it can be seen that user John has accessed files 0, 1, 6, 9, 10, and 15. With this bitmap implementation, only four bitmap tables need to be checked and each bitmap table has a manageable size. For example for 10,000 files, only 1,250 bytes are needed and the detection of whether a bit is set or not can be quickly checked. The bitmap table makes easy to check the relationship between different elements and as consequence checking of a file access can be checked easily against a baseline.

The four bitmap implementation centered around the user and the coverage can be improved with more bitmaps as listed above. The bitmap implementation of FIG. 8 can be used to implement the direct relationship between the information 304 and access mode 306 or other direct relationship between the information 304 and location 308 or time 310. Each bitmap table depicts a direct relationship between two basic elements. In the example described previously, when John accesses a file and the bit for that file is not set in the bitmap table 80, it means that John is accessing a file that he has not accessed before and an alert should be issued. If the file bit is set, then it should be checked the bitmap table for the access mode, the bitmap table for location, and the bitmap for time. If any one of the bitmap tables has a bit corresponding to the access mode, location, or time no set, then the bit will be set and an alert will be issued. When any anomaly is detected by any direct relationship bitmap, the information access request associated with that transaction is retrieved, flagged, and presented to a system administrator for action.

There are situations where an abnormal situation may not be detected by checking the access by any individual user, but detectable by checking other indicators. For example, a file access by applications X, Y, and Z are considered normal, but a sequential access by these applications may not be normal. This may be a situation of undesirable access by someone who disguises his identity behind different applications. This type of undesirable access can be detected by checking the bitmap that depicts the direct relationship between the files (what) and time (when).

So far it has been described the implementation of the baseline information through bitmap tables and comparison to the baseline through comparing bitmap tables. However, as stated in the paragraph above, the bitmap table comparison may not detect some undesirable accesses. The implementation of the baseline information can be further improved through association with additional counters and timers. A set of counters are associated with each member. Three basic types of counters are recommended: new access, usage, and error. New access counter tracks new access by each member. Usage counter tracks number of records accessed (read/write, number of transactions, etc) by a member. Error counter tracks number of different errors (login failure, read error, administration error, write error, time out, etc) associated with each member. Besides the direct relationship bitmaps, counters may also be used to track information access. A usage counter and an error counter may be used to track accesses. If a user accesses a particular file regularly once 10 to 15 times a day and then he starts to access the same file 30 to 35 times a day, an alert should be issued even if he is allowed to access that file. If there is an excessive error caused by access to a file but each error associated with a different user, this should also raise a flag and an alert issued because this may be indication that someone is using other people's identity to access that file. A timer may also be associated with each file to detect abnormal access time. If a file is normally accessed less than 5 minutes each time and now the file starts being accessed for longer time, an alert should also be issued.

Figure 9:
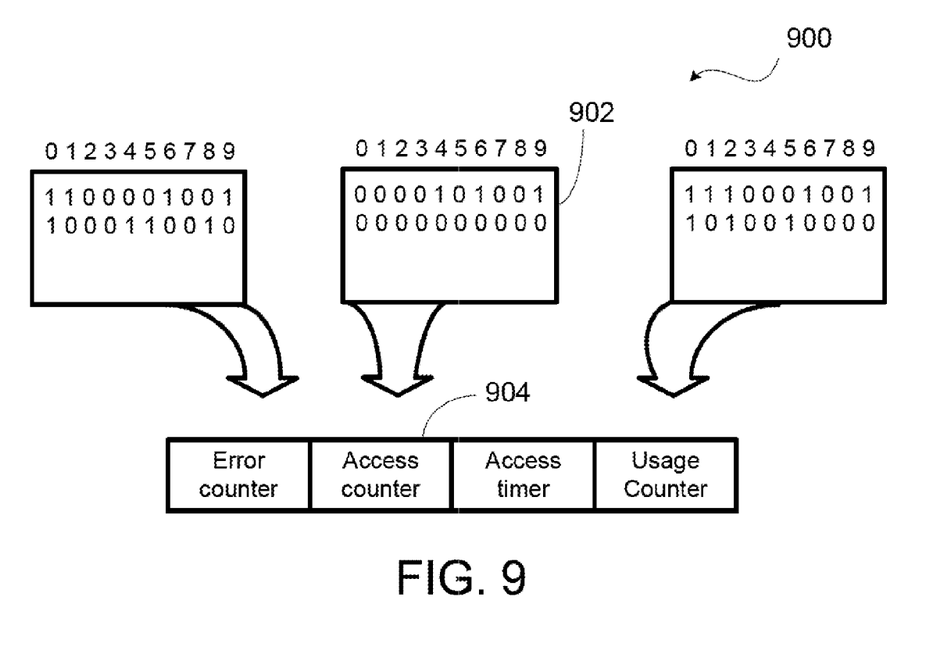
FIG. 9 depicts an exemplary additional counters and timer and their relationship with bitmap tables.

FIG. 9 is a simple illustration 900 of relationships between bitmap tables and different counters and timers. The information on each counter is derived from one or more bitmap tables and for each counter a threshold may be set. The counters are modified according to the modification of bitmap tables. The counters record events from the bitmaps and may be cleared periodically. So, in essence, each counter counts events per certain time period. For example, if a user normally accesses a file during any particular work day using three different access method and each access method would be set in a corresponding bitmap table 902 (three bits are set), then a corresponding access counter 904 would be set to three. If on a particular day, the access counter 904 reaches five, an alert will be issued. Besides comparing with the user's historical data, the system may also compare with historical data for the group to which the user belong. For example, if the user belongs to group "analyst," and the threshold for the access counter for group "analyst" is six, then no alert or an alert of lower level may be issued. One skilled in the art that similar counters can be associated with other basic elements such as user, location, and time.

Usage of counters in combination with bitmap tables enables many abnormal accesses to be detected. For example, a counter for evening access may detect new access requests during evening hours may raise alerts that otherwise would not raise during the daytime. A usage counter may detect excessive accesses during a certain period from multiple users, when each user does not cause excessive access requests during that period.

Figure 10:
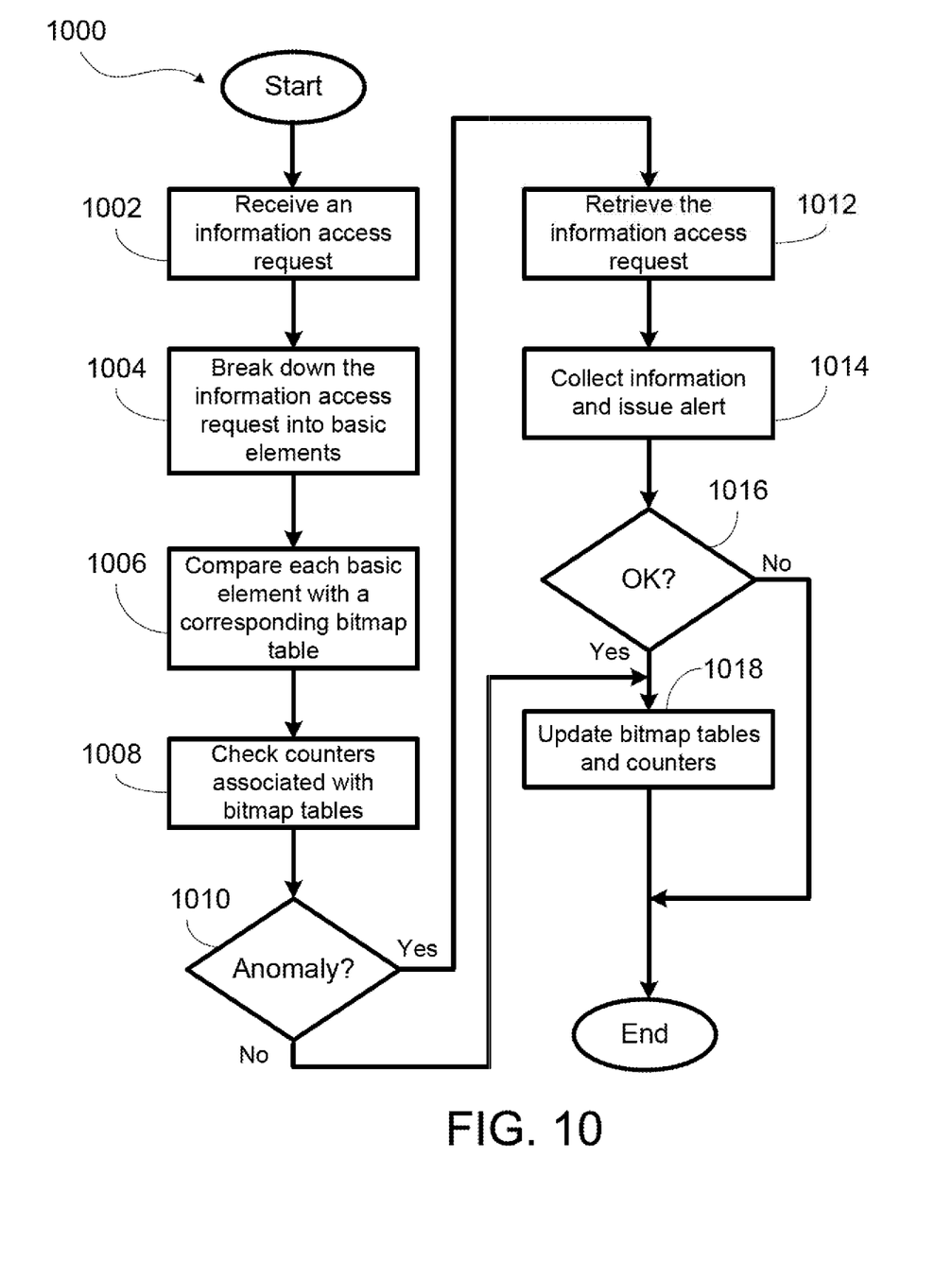
FIG. 10 illustrates an alternative method for detecting anomaly in information access request.

FIG. 10 depicts an alternative method 1000 for detecting anomaly in information access requests using bitmap implementation. A system such as depicted in FIG. 5 receives an information access request from a user or a process, step 1002, and parses the request into basic elements, step 1004. Instead of comparing the entire request with a complex database, each element from the parsing step is compared with one or more bitmaps, where each bitmap represents a direct relationship between two basic elements, step 1006. For example, when user John requests an access to a file "monthly sales data," the system checks a bitmap for file access and check if the bit representing "monthly sales data" is set. The particular bitmap checked is for user John. If user Mary has requested the same file, the bitmap checked would be different one from one checked for John. The system will check all the bitmaps representing the direct relationships between the basic elements.

Besides checking the direct relationship bitmaps, the system will also check related counters and timers associated with the bitmap tables, step 1008. Anomaly is detected if during the comparison the threshold of at least one counter is exceeded. If an anomaly is detected, step 1010, because the bitmap tables do not give all the information regarding the information access request, the system will retrieve the information access request, step 1012, collect the additional information, and issue an alert, step 1014, with pertinent information from the information access request. The alert can be displayed on a display screen attached to the system or any other local or remote display means. The system will check if the alert is acceptable, step 1016, the system will update the baseline information by updating corresponding bitmap tables and counters, step 1018. If the alert is deemed not acceptable, for example as part of an attack to the system, the baseline information will not be updated with the information from this particular access request. If there is no anomaly, the system will update the counters and bitmap tables, if necessary, in the baseline information, step 1018.

Figure 11:
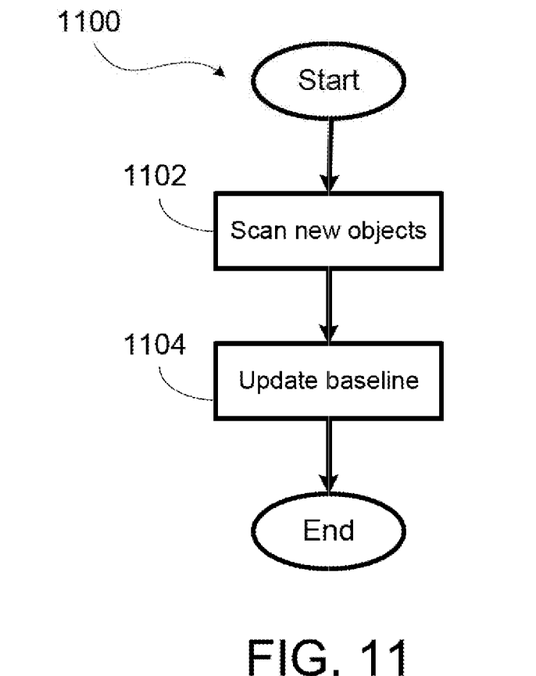
FIG. 11 illustrates a method for updating baseline information.

The baseline used for comparing each information access request is updated continuously. The system will scan for new objects and include them in the bitmap table. If there are new files, then the new files will be included in the bitmap table for files. Besides updating with each information access request, the baseline is also updated whenever there is a new object in the file system as illustrated by FIG. 11. The system continuously scans for new objects, step 1102, and updates the baseline information whenever new objects are found, step 1104. Because the baseline information is implemented by a plurality of bitmap tables, the baseline information can be thus updated easily as described above.

The present invention when implemented by a computer system as described in FIG. 4 and related description models each information access request into basic elements. The system also continuously discovers and tracks new members for each element group. The baseline behavior or historical information is represented by multiple bilateral associations between basic elements as described in FIG. 3. These associations are tracked using bitmap tables as described in FIG. 8 and additional counters are also used to define a baseline behavior as described in FIG. 9. The counters are used to compare with their respective thresholds and to issue alerts when anomaly is detected. The anomaly may become part of the historical behavior if a determination is made by a system administrator or an expert system.

The method of the present invention can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a networking computer platform, such as a magnetic disk or tape, optical disk, hard disk, flash memory, or other storage media as is known in the art.

In the context of FIGS. 4 and 10-11, the steps illustrated do not require or imply any particular order of actions. The actions may be executed in sequence or in parallel. The method may be implemented, for example, by operating portion(s) of a network device, such as a network router or network server, to execute a sequence of machine-readable instructions. The instructions can reside in various types of signal-bearing or data storage primary, secondary, or tertiary media. The media may comprise, for example, RAM (not shown) accessible by, or residing within, the components of the network device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media. The instructions when executed by a computer will enable the computer to perform the steps illustrated in FIGS. 4 and 10-11.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A system for detecting anomalous behavior in information access, comprising:
   a network interface unit for receiving data packets containing an information access request;
   a memory for storing a database containing historical behavior information, the historical behavior information being implemented through a plurality of bitmap tables and counters, content of each counter being derived from the bitmap tables, each counter having a threshold; and
   a controller for analyzing the information access request, parsing the information access request into a plurality of basic elements, the plurality of basic elements comprises who, how, what, where, and when, and storing the information access request in the memory,
   wherein
   the controller
      compares each parsed basic element of the information access request with one or more tables, each table relating two basic elements, records a result of comparison into one or more counters,
      issues an alert if a counter exceeds the threshold associated with this counter,
      checks whether there is a baseline associated with a parsed content of the information access request, and
      establishes a baseline using the parsed content of the information access request if there is no baseline associated with the parsed content of the information access request,
   the plurality of basic elements directly map to information embedded in the information access request received by the network interface, and
   if a counter has no threshold, the controller sets a new threshold for the counter using information from a parsed basic element associated to the counter.

2. The system of claim 1, wherein the controller further updates the historical behavior information according to the information access request.

3. The system of claim 1, wherein the alert is associated with a level and the controller further decreases the level for the alert generated from a similar future information access.

4. The system of claim 1, wherein the controller further tracks association among basic elements.

5. The system of claim 1, wherein, if an alert is issued, the controller retrieves the information access request related to the issued alert.

6. The system of claim 1, wherein the plurality of tables include a bitmap table depicting a relationship between a file and a number of times when the file has been accessed.

7. A method for detecting anomalous information access, comprising the steps of:
   receiving, by a network interface unit, data packets containing an information access request;
   storing a database containing historical behavior information in the storage unit, the historical behavior information being implemented through a plurality of bitmap tables and counters, content of each counter being derived from the bitmap tables, each counter having a threshold;
   analyzing the information access request,
   parsing, by a controller, contents of the information access request into a plurality of basic elements, which comprises who, how, what, where, and when;
   checking whether there is a baseline associated with a parsed content of the information access request;
   if there is no baseline associated with the parsed content of the information access request, establishing a baseline using the parsed content of the information access request;
   recording, by the controller, each basic element of the information access request in the table representing the historical behavior information, each table correlating two basic elements;
   the plurality of basic elements directly map to information embedded in the information access request received by the network interface,
   modifying a counter according to the bitmap table;
   issuing an alert if the counter exceeds the threshold set for the counter; and
   if the counter has no threshold, setting a new threshold for the counter using information from a basic element associated to the counter.

8. The method of claim 7, further comprising the steps of:
   checking if the alert is acceptable; and
   if the alert is acceptable, updating, by the controller, at least one table representing the historical behavior information according to the contents of the information access request.

9. The method of claim 7, further comprising the step of decreasing a level associated with the alert generated from a similar future information access request.

10. The method of claim 7, further comprising the step of tracking association among the basic elements.

11. The method of claim 7, wherein the historical behavior information further comprises a plurality of tables, each table depicting a relationship between two basic elements.

12. A method for detecting anomalous information access, comprising the steps of:
   receiving an information access request at a network interface;
   storing the information access request in a storage unit;

storing a database containing historical behavior information in the storage unit, the historical behavior information being implemented through a plurality of bitmap tables and counters, content of each counter being derived from the bitmap tables;

analyzing the information access request, parsing the information access request into a plurality of basic elements, the basic elements comprising who, how, what, where, and when;

checking whether there is a baseline associated with a parsed information of the information access request;

if there is no baseline associated with the parsed content of the information access request, establishing a baseline using the parsed content of the information access request;

the plurality of basic elements directly map to information embedded in the information access request received by the network interface, comparing each basic element in the parsed information with at least one table that relates two basic elements;

recording events from the at least one table into at least one counter; and if an anomaly is detected at the comparing step, issuing an alert; and clearing the at least one counter periodically.

13. The method of claim 12, further comprising the step of retrieving the information access request from the storage unit.

14. The method of claim 12, further comprising the step of checking a timer associated with the at least one table.

15. The method of claim 12, further comprising the step of checking an access counter associated with the at least one table.

16. The method of claim 12, further comprising the steps of:
checking if the alert is acceptable; and
updating the at least one table according to the basic element if the alert is acceptable.

17. The method of claim 16, wherein the step of updating the at least one table further comprising the step of determining if the alert is acceptable by a system administrator.

18. The method of claim 12, wherein the step of issuing an alert further comprising the steps of:

retrieving the information access request; and
collecting additional information from the information access request.

19. A non-transitory computer readable medium on which is stored a computer program for assigning system resources to connections associated with an originating server and a destination server in a communication network, the computer program comprising computer instructions that when executed by a computing device performs the steps for:

receiving, by a network interface unit, data packets containing an information access request;

storing a database containing historical behavior information in the storage unit, the historical behavior information being implemented through a plurality of bitmap tables and counters, content of each counter being derived from the bitmap tables, each counter having a threshold;

analyzing the information access request;

parsing, by a controller, contents of the information access request into a plurality of basic elements, which comprises who, how, what, where, and when;

checking whether there is a baseline associated with a parsed content of the information access request;

if there is no baseline associated with the parsed content of the information access request, establishing a baseline using the parsed content of the information access request;

compares each parsed basic element of the information access request with one or more tables;

recording, by the controller, each basic element of the information access request in the table representing the historical behavior information, each table correlating two basic elements; the plurality of basic elements directly map to information embedded in the information access request received by the network interface unit;

modifying a counter according to the bitmap table;

issuing an alert if the counter exceeds the threshold set for the counter; and if the counter has no threshold, setting a new threshold for the counter using information from a basic element associated to the counter.

* * * * *